United States Patent
Higashide et al.

(10) Patent No.: US 8,229,584 B2
(45) Date of Patent: Jul. 24, 2012

(54) ABNORMALITY DETECTION SYSTEM AND METHOD OF DETECTING ABNORMALITY

(75) Inventors: Masanobu Higashide, Kawasaki (JP); Gouki Sadakuni, Tokyo (JP)

(73) Assignees: Renesas Electronics Corporation, Kanagawa (JP); NEC Corporation, Tokyo (JP)

( * ) Notice: Subject to any disclaimer, the term of this patent is extended or adjusted under 35 U.S.C. 154(b) by 613 days.

(21) Appl. No.: 11/653,258

(22) Filed: Jan. 16, 2007

(65) Prior Publication Data

US 2007/0203603 A1 Aug. 30, 2007

(30) Foreign Application Priority Data

Jan. 16, 2006 (JP) ................................ 2006-007403

(51) Int. Cl.
- *G06F 19/00* (2006.01)
- *G06F 11/30* (2006.01)
- *G01R 31/00* (2006.01)
- *G01N 37/00* (2006.01)

(52) U.S. Cl. ........ 700/110; 700/109; 700/175; 700/177; 702/58; 702/83; 702/84; 702/185

(58) Field of Classification Search .................... 700/51, 700/95, 107–110, 175, 177; 702/58, 60, 702/81–82, 185
See application file for complete search history.

(56) References Cited

U.S. PATENT DOCUMENTS

| | | | | | |
|---|---|---|---|---|---|
| 4,100,598 A | * | 7/1978 | Stiel et al. | ...................... | 700/206 |
| 4,972,093 A | * | 11/1990 | Cochran et al. | .......... | 250/559.08 |
| 5,841,676 A | * | 11/1998 | Ali et al. | ......................... | 702/84 |
| 6,061,640 A | * | 5/2000 | Tanaka et al. | .................... | 702/81 |
| 6,353,767 B1 | * | 3/2002 | Wakeman et al. | .............. | 700/91 |
| 6,604,012 B1 | * | 8/2003 | Cho et al. | ....................... | 700/121 |
| 6,718,818 B2 | * | 4/2004 | Dutt et al. | ........................... | 73/49 |
| 7,187,992 B2 | * | 3/2007 | Tuszynski | ......................... | 700/97 |
| 7,209,846 B2 | * | 4/2007 | Tamaki et al. | ................... | 702/84 |
| 7,275,016 B2 | * | 9/2007 | Gross et al. | ..................... | 702/182 |
| 7,349,753 B2 | * | 3/2008 | Paik | .............................. | 700/110 |
| 7,356,377 B2 | * | 4/2008 | Schwarm | ...................... | 700/108 |

(Continued)

FOREIGN PATENT DOCUMENTS

JP 5-5524 1/1993

(Continued)

OTHER PUBLICATIONS

Paris, Process or Product Monitoring and Control, Engineer Statistics Handbook, 2005, chapter 6, section 6.3.2.2, http://www.itl.nist.gov/div898/handbook/.*

(Continued)

*Primary Examiner* — Albert Decady
*Assistant Examiner* — Darrin Dunn
(74) *Attorney, Agent, or Firm* — Young & Thompson

(57) ABSTRACT

An abnormality detection system includes a measurement unit, a decision unit, an alarm unit, and storage units, and serves to detect the abnormality in a control characteristic value of a plurality of products manufactured on the same production line. The decision unit receives the control characteristic value stored in the storage unit, and decides whether an abnormality exists, based on that value. More specifically, the decision unit decides that the control characteristic value is abnormal when, with respect to m (m is a natural number) pieces of the products that are consecutively manufactured, an absolute value of a difference in control characteristic value between each of the products and another manufactured immediately before the former is equal to or less than a predetermined constant.

7 Claims, 17 Drawing Sheets

U.S. PATENT DOCUMENTS

| | | | |
|---|---|---|---|
| 7,596,469 B2 * | 9/2009 | Godara | 702/183 |
| 2002/0055194 A1 * | 5/2002 | Takanabe | 438/14 |
| 2003/0100970 A1 * | 5/2003 | Chen | 700/108 |
| 2003/0133100 A1 * | 7/2003 | Hu et al. | 356/138 |
| 2003/0229464 A1 * | 12/2003 | Takanabe | 702/84 |
| 2004/0030438 A1 * | 2/2004 | Popp et al. | 700/122 |
| 2005/0031187 A1 * | 2/2005 | Lin et al. | 382/145 |
| 2005/0052284 A1 * | 3/2005 | Schmidtberg et al. | 340/588 |
| 2005/0075835 A1 * | 4/2005 | Tseng et al. | 702/179 |
| 2005/0177260 A1 * | 8/2005 | Schweizerhof et al. | 700/97 |
| 2005/0197806 A1 * | 9/2005 | Eryurek et al. | 702/188 |
| 2005/0247568 A1 * | 11/2005 | Svoevskiy et al. | 205/336 |
| 2006/0142931 A1 * | 6/2006 | Cho | 701/114 |
| 2006/0287836 A1 * | 12/2006 | Mateo Martinez | 702/39 |
| 2007/0219657 A1 * | 9/2007 | Tuszynski | 700/97 |
| 2007/0260350 A1 * | 11/2007 | Zagrebnov | 700/121 |

FOREIGN PATENT DOCUMENTS

| | | |
|---|---|---|
| JP | 05-333834 | 12/1993 |
| JP | 8-166646 | 6/1996 |
| JP | 9-23481 | 1/1997 |
| JP | 10-142002 | 5/1998 |
| JP | 2000-194968 | 7/2000 |
| JP | 2001-067109 | 3/2001 |
| JP | 2002-236511 | 8/2002 |
| JP | 2005-121410 | 5/2005 |

OTHER PUBLICATIONS

Guh et al. (On-line Control chart pattern detection and discrimination—a neural network approach, Artifical Intelligence Enginerring 13 (1999) 413-425.*

Paris, Process or Product Monitoring and Control, Engineer Statistics Handbook, 2005, chapter 6, section 6.3.2.2, http://www.itl.nist.gov/div898/handbook.*

Guh et al., (On-line Control chart pattern detection and discrimination—a neural network approach, Artificial Intelligence Engineering 13 (1999) 413-425.*

JP Office Action dated Dec. 13, 2011, with English Translation.

Japanese Office Action dated May 10, 2011 in corresponding Japanese Application No. 2006-007403 with English translation of enclosed pertinent portion.

* cited by examiner

FIG. 14

|  | ACTUALLY ABNORMAL | ACTUALLY NOT ABNORMAL |
|---|---|---|
| DECIDE AS ABNORMAL | CORRECT | TYPE-1 ERROR ($\alpha$) |
| DECIDE AS NORMAL | TYPE-2 ERROR ($\beta$) | CORRECT |

US 8,229,584 B2

ABNORMALITY DETECTION SYSTEM AND METHOD OF DETECTING ABNORMALITY

This application is based on Japanese patent application No. 2006-007403, the content of which is incorporated hereinto by reference.

BACKGROUND

1. Technical Field

The present invention relates to an abnormality detection system that detects abnormality in control characteristic values of a plurality of products manufactured on the same production line, and to a method of detecting the abnormality.

2. Related Art

Administration process based on control charts currently in practice has been established on the premise of employing data acquired through measurement, calculating averages and ranges by hand, and marking plots on graphs. Thus, various contrivances that can eliminate the need to use a calculator are incorporated in the process.

Japanese Laid-open patent publication No. H05-333834 (patent document 1) discloses a control chart display apparatus that distinctly displays on the same screen a plurality of abnormal points in the control chart. The examples of the abnormalities to be detected cited in this document are following (a) to (e).

(a) Maldistribution on one side. The case where a majority of the points concentrates on one side of the center. For example, when 7 consecutive points all, 10 points or more out of 11 consecutive points, 12 points or more out of 14 consecutive points, 14 points or more out of 17 consecutive points, or 16 points or more out of 20 consecutive points appear on one side of the center.

(b) Upward trend or downward trend (c) Periodicity (d) Approximation to a control limit (e) Excess of the control limit FIG. 5 is a graph included in the patent document 1 as an example of the display of the abnormal points. In the graph, the center line CL (center line), the upper control limit UCL (upper control limit), and the lower control limit LCL (lower control limit) are shown. Here, a plot 131 and a plot 132 indicate the abnormality. The plot 131 corresponds to the item (a), because the consecutively 7 points including the plot 131 are below the center line CL. The plot 132 corresponds to the item (e), because of exceeding the upper control limit UCL. Thus the plot 131 and the plot 132 represent different abnormality patterns, and accordingly the patent document 1 teaches that displaying the abnormalities in different manners according the pattern allows explicitly distinguishing the abnormalities on the control chart.

Semiconductor device production lines are highly automated and electronically controlled today, with little participation by a human in processing works. One process (equipment) and another are combined via an automatic conveyor, and upon completion of a wafer processing in a certain process the information to that effect is transmitted to a host computer, for executing a centralized control. Then the wafer is conveyed to the subsequent process.

For the purpose of controlling the processing performance of the wafer and the electrical characteristics, the thin films thickness, the interconnects line widths, widths of the trenches, number of micro-defects, electrical characteristics and so forth formed on the wafer are acquired through measurement of the wafer. The wafers to be measured include those on which the devices are actually being processed and a monitoring wafer employed exclusively for the measurement. The data thus acquired is often transmitted to the host computer upon completion of the processing work (including the measurement) of the respective processes.

Various data representing the status of the equipments employed for the wafer processing is also transmitted to the host computer. Such data may be transmitted upon completion of the process, or any time irrespective of the timing of finishing the process.

In the electronically controlled and automated semiconductor device production line, graph drawing of the control data and abnormality decision are also automated. In such a production line, the graphs are not made up by human handworks, but the host computer contains thousands to hundreds of thousand types of control graphs, on which more than a hundred thousand plots are marked per day, for monitoring the production process. The host computer also contains programs that enable retrieving only the abnormality decision information, thereby providing a highly efficient control system.

Here, various rules have conventionally been employed for deciding the abnormality in the system based on the control charts. For example, JIS specification (JIS Z9021) stipulates eight types of abnormality decision rules as a guideline. The abnormalities specified in those rules generally become visible when the process result has some abnormal tendency. In practical operations, not all of those rules are applied, but one of the rules is selected in consideration of fluctuation inherent to the process. Such procedure is expressly provided in JIS Z9021.

Referring to graphs shown in FIGS. 6 to 13, the eight patterns of abnormality decision rules will be reviewed. In all the graphs, a solid triangle (▲) represents the plot decided to be abnormal. The abnormality decision rules corresponding to the respective graphs are as follow:

FIG. 6: One plot exceeding the control limit

FIG. 7: Nine consecutive plots on either side of the centerline

FIG. 8: Six consecutive plots consecutively increasing or decreasing

FIG. 9: Fourteen plots alternately increasing and decreasing

FIG. 10: Two plots exceeding $2\sigma$ out of three consecutive plots, where $\sigma$ is the standard deviation FIG. 11: Four plots exceeding $1\sigma$ out of five consecutive plots FIG. 12: Fifteen consecutive plots within $1\sigma$ FIG. 13: Eight consecutively plots exceeding $1\sigma$ In the case where the control characteristic values are in accordance with the normal distribution and the alignment of the plots is not biased, the probability that a type-1 error occurs from the decision rule relevant to FIG. 6 is 0.27%. With respect to the rules relevant to FIGS. 7 to 13 also, the probability that the type-1 error occurs is approximately 0.3%. The type-1 error herein means, as shown in FIG. 14, an error of deciding as abnormal despite actually being normal. On the other hand, an error of deciding as normal despite actually being abnormal is referred to as a type-2 error.

In the electronically controlled semiconductor device production line, it is not unusual that more than a hundred thousand plots are marked per day on thousands to hundreds of thousand types of control graphs. Accordingly, based on the rule relevant to FIG. 6, approximately 270 (100,000×0.27%) cases or more are decided to be abnormal each day, despite actually being normal. In addition, based on all the rules relevant to FIGS. 6 to 13, more than two thousand cases are decided to be abnormal though they are not. Some control characteristic values present a gradual increase or gradual decrease, even under a normal status. When the rule relevant to FIG. 7 or FIG. 8 is applied to such characteristic values, the probability that the type-1 error occurs becomes far much greater than 0.3%.

When an alarm is issued to announce that the abnormality decision has been made, the process is suspended by turning off the equipments and detaining the products, for performing inspection. Therefore, issuing more than two thousand alarms each day based on the type-1 error incurs significant waste of time and resources, since actually the alarms do not correspond to any abnormality.

Accordingly, it is essential to distinguish the alarms originating from real abnormalities. The alarms based on the type-1 error should be minimized to a lowest possible level, thus to permit only the alarm based on the real abnormality to be issued. That is why the abnormality decision rules are appropriately selected in consideration of the fluctuation inherent to each process, and focusing on abnormalities that have to be particularly sensitively detected.

SUMMARY OF THE INVENTION

As reviewed above, in the semiconductor device production line the majority of the process data can be acquired automatically (i.e. on-line), so that the administration based on the graphs (based on the specification or control charts) may be performed utilizing the automatically acquired data. When abnormality is found in the process data, the abnormality decision is executed, so that the alarm is issued to operators and engineers and the equipments and products are stopped.

However, while the automation has been achieved in all of the data acquisition, calculation, graph drawing and abnormality decision, it has now been discovered that characteristic abnormalities exist that cannot be decided as abnormal by the conventional abnormality decision method, or that can only be detected through numerous type-1 errors. Such abnormalities are associated with a measurement system and a communication system.

Referring to FIGS. 15 to 17, examples of such abnormalities will be described. FIG. 15 is a graph showing an example of measurement data of the number of defects provided by a micro-defect inspection equipment that employs a laser beam. In this example, an upper control threshold is eight (pieces), and the measurement values normally transit in a range of 0 to 5 (pieces) or so. However, when something goes wrong in a reading system of the laser scattered beam in the inspection equipment, in a data calculation system, or in the communication system, the measurement value may become "zero". In such a case, although there are some defects actually, the data representing zero is transmitted to the host computer, and hence zero is consecutively marked on the graph. In FIG. 15, the plots <1> to <10> (corresponding to circled numerals, in other drawings alike) represent such a case.

Since this example represents the control of the number of micro-defects, the detection sensitivity should be increased with respect to the case of exceeding the upper limit (Ref. FIG. 6) and the case where the value increases (Ref. FIGS. 8 and 10). In other words, when performing the specification control it is of primary importance to determine the upper control limit, so as to issue the alarm when the limit is exceeded or approached. Such arrangement enables minimizing the alarms originating from the type-1 error and issuing only the alarms that are really necessary. Specifically, the rule relevant to FIG. 6, FIG. 8 or FIG. 10 is to be primarily applied.

When applying the rule relevant to FIG. 10, the CL is set at zero. In this case, the rules relevant to FIGS. 7, 9, 12 and 13 cannot be applied since those rules require setting the CL. Setting the CL at zero in the rule relevant to FIG. 7 as in the rule relevant to FIG. 10 results in the problem that the alarm keeps being issued after the ninth plot.

Alternatively, a statistical method may be incorporated in the administration based on the control charts. In this case, an average value is obtained so as to utilize as the CL, and hence the rules relevant to FIGS. 7, 9, 12 and 13 can be applied. However, since the purpose of the control is to issue the alarm when the number of micro-defects exceeds or becomes about to exceed the upper control limit, the rule relevant to FIG. 6, 8 or 10 still has to be primarily applied.

Hereunder, the drawback will be described that may arise from employing only the conventional abnormality decision rule for detecting the plots <1> to <10> marked because of a malfunction in the reading system of the laser scattered beam in the inspection equipment, the data calculation system, or the communication system. Applying the rule relevant to FIG. 7 does allow issuing the alarm when values below the CL are consecutively marked. However, since thousands of plots are marked per day on the control graph of the number of micro-defects, the alarm would be activated by the type-1 error approximately ten times (ex. 3,000×0.27%) each day. Stopping the production line and the products each time such false alarm is issued incurs a considerable loss of time and resources. Besides, the alarm is not activated until nine consecutive plots are marked, which inhibits detecting the defect at an early stage. On the other hand, activating the alarm with three to five consecutive plots below the CL, for earlier detection of the defect, leads to a significant increase in type-1 errors, thus incurring too frequent suspension of the production line. Consequently, depending solely on the conventional abnormality decision rules is not sufficient in effectively detecting the abnormality.

FIG. 16 is a graph showing a concentration transition of a component "a" in a cleaning solution employed in a process of cleaning the wafer. The concentration of the component "a" in the solution is measured by an exclusive concentration meter. The measurement data is transmitted to the host computer for the controlling purpose. When the concentration meter itself becomes defective, or when the cable suffers imperfect contact or tear, a constant value deviating from the control threshold range (3.50 to 4.50% in this example), such as 0 or 100(%), may be transmitted. However, a constant value within the control threshold range may also be consecutively transmitted, depending on the type of the defect. Numerals <1> to <10> in FIG. 16 represent such plots.

In case that the concentration of the component "a" in the wafer cleaning equipment deviates from the control threshold range, the wafer may be excessively etched or the cleaning effect may be drastically degraded, thereby significantly affecting the quality such as product characteristics and yield. To prevent such problems, the concentration of the component "a" should be controlled. In this equipment, however, generally the concentration of the component "a" is on the higher side immediately after replacement of the cleaning solution, but then gradually lowered thus dropping to the lower side before the next replacement. Accordingly, applying the rule relevant to FIG. 7 or 8 leads to a significant increase in type-1 error, and hence it is undesirable to apply those rules. Instead, since the equipment monitors the concentration each time the wafer is washed, it is appropriate to select the rule from the viewpoint of whether the concentration is within, or about to exceed, the control threshold. Usually, therefore, the rule relevant to FIG. 6 or 10 is applied.

Again, the drawback will be described that may arise from employing only the conventional abnormality decision rule for detecting the plots <1> to <10> marked because of a malfunction in the reading system of the laser scattered beam in the inspection equipment, the data calculation system, or the communication system. Although applying the rule relevant to FIG. 7 may enable detecting the abnormality, the type-1 errors are significantly increased as described above, which leads to a considerable loss of time and resources. Besides, the rule relevant to FIG. 7 does not work if values equal to the CL are consecutively transmitted to the host computer. Further, since the alarm is not activated until nine consecutive plots are marked, it is not possible to detect the detect at an early stage. On the other hand, activating the alarm with three to five consecutive plots below the CL for earlier detection of the defect leads to a significant increase in type-1 errors, thus incurring too frequent suspension of the production line. Consequently, in this case either, the abnormality cannot be effectively detected.

FIG. 17 is a graph showing a transition in the pressure of an ion implantation equipment. The ion implantation equipment is employed for implanting impurity ions into the wafer in a chamber maintained in a vacuum state. The pressure is measured by a measuring terminal called ion gauge. Here, in case that the ion gauge fails, a constant value indicating a low pressure may often be consecutively output. Numerals <1> to <10> in FIG. 17 represent such plots.

A reason of controlling the pressure by the ion gauge is as follows. When the pressure is high, the impurity ion collides with a gas molecule floating in the chamber, and the impurity ion (normally positive ion is used) is neutralized. In this case, since the amount of the ion implanted into the wafer is detected based on a current value converted from the positive ion, the ion gauge recognizes that the amount of the implanted ion is less than actually is. Accordingly the ion is implanted until the current value corresponding to the predetermined implanting amount is reached, which results in implanting an excessive amount of ions. This naturally incurs abnormal electrical characteristics of the product, thereby degrading the yield of the products. Thus, the pressure of the chamber is monitored so as to remain within a predetermined range, each time the wafer is processed.

Regarding the ion implantation equipment, therefore, the control of the chamber pressure is a critical issue. Accordingly, the upper control limit is set so that the alarm is activated when the degree of vacuum comes close to or exceeds the upper control limit value. Specifically, the rule relevant to FIG. 6, 8 or 10 is primarily applied, as the example of FIG. 15. Since the CL is not set in most of the cases, the rules relevant to FIG. 7, 9, 12 or 13 cannot be applied.

Meanwhile, when the CL value or the control threshold is provided based on the control chart method, the rule relevant to FIG. 7 can be applied. However, the rule relevant to FIG. 6, 8 or 10 is primarily applied, for a similar reason to the case of FIG. 15. Although applying the rule of FIG. 7 may enable detecting the abnormality, the type-1 errors are significantly increased.

Whereas a vacuum pump is employed for maintaining the vacuum state of the ion implantation equipment, generally the chamber pressure is on the lower side immediately after a maintenance work of the vacuum pump, but gradually increases through repeated processing of the wafers, thus falling to the higher side before undergoing the next maintenance. Applying the rule of FIG. 7 is, therefore, most likely to frequently activate false alarms because of the type-1 error.

Employing only the conventional abnormality decision rule for detecting the plots <1> to <10> marked because of a malfunction in the ion gauge may incur the following drawback. Although setting the CL value and the control threshold based on the control chart method and applying the rule of FIG. 7 may enable detecting the abnormality, false alarms because of the type-1 error are likely to be frequently activated. Consequently, in this case either, the abnormality cannot be effectively detected.

As described throughout the foregoing passages, when controlling the data with respect to a highly automated production line, the abnormality arising from the malfunction of the measurement system or communication system, such as the examples shown in FIGS. 15, 16 and 17, may not be properly detected with the conventional control method. In this case, although the wafer is conveyed to the subsequent process, since the abnormality has not been detected the wafer is not identified as being defective. Thus, the abnormality that has actually been present can only be discovered after significant degradation in electrical characteristics or yield of final products is recognized. Such situation incurs a great economical loss. Besides, even though some of the abnormality decision rules may be capable of detecting such abnormality, applying that rule often leads to the problem that false alarms because of the type-1 error are frequently activated.

According to the present invention, there is provided an abnormality detection system that detects an abnormality in a control characteristic value of a plurality of products manufactured on a same production line, including: a storage unit that stores the control characteristic value measured with respect to the products; and a decision unit that acquires the control characteristic value from the storage unit to decide whether the following condition (i) is satisfied:

(i) with respect to m pieces (m is a natural number) of the products that are consecutively manufactured, an absolute value of a difference in the control characteristic value between each of the products and the product manufactured immediately before the former is equal to or less than a predetermined constant, and decides that the control characteristic value is abnormal when the condition (i) is satisfied.

According to the present invention, there is also provided a method of detecting an abnormality in a control characteristic value of a plurality of products manufactured on a same production line, including: storing in a storage unit the control characteristic value measured with respect to the products; acquiring the control characteristic value from the storage unit to decide whether the following condition (i) is satisfied:

(i) with respect to m pieces (m is a natural number) of the products that are consecutively manufactured, an absolute value of a difference in the control characteristic value between each of the products and the product manufactured immediately before the former is equal to or less than a predetermined constant;

and deciding that the control characteristic value is abnormal when the condition (i) is satisfied.

In the abnormality detection system and method of detecting the abnormality thus arranged, the abnormality is decided to exist when generally the same control characteristic values are detected (m+1) consecutive times. Such arrangement allows suppressing occurrence of the type-1 error and effectively detecting the abnormality in control characteristic values originating from the malfunction of the measurement system or communication system.

Thus, the present invention provides an abnormality detection system and a method of detecting abnormality that allow suppressing occurrence of a type-1 error and effectively detecting the abnormality in control characteristic values originating from a malfunction of a measurement system or a communication system.

BRIEF DESCRIPTION OF THE DRAWINGS

The above and other objects, advantages and features of the present invention will be more apparent from the following description taken in conjunction with the accompanying drawings, in which:

FIG. 14 is a graph for explaining a type-1 error and a type-2 error;

DETAILED DESCRIPTION

Figure 1:
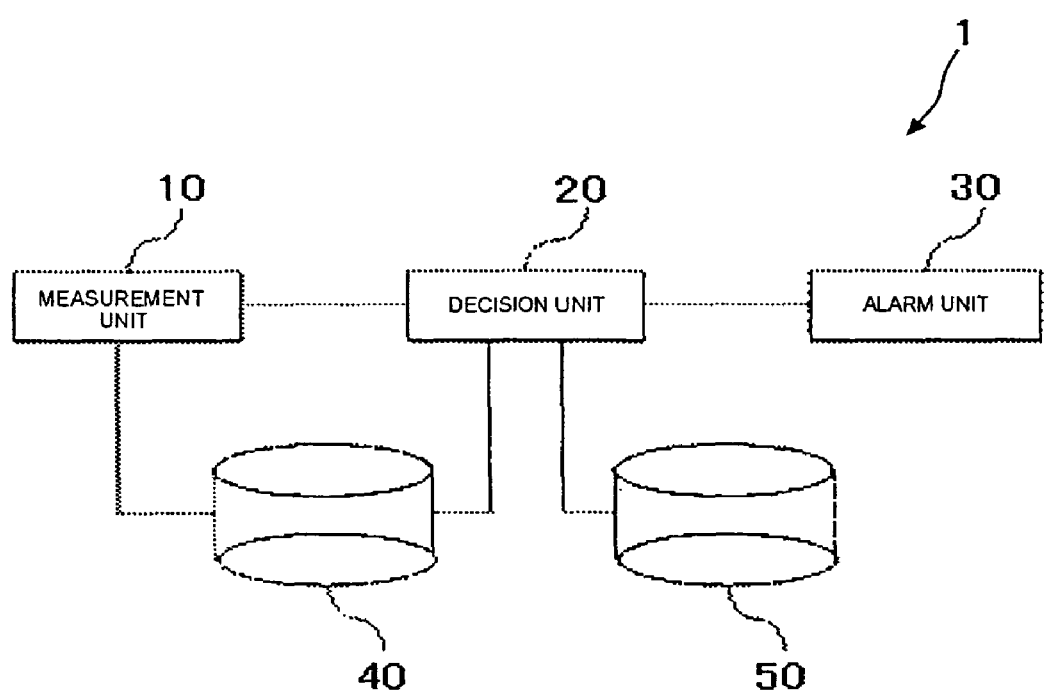
FIG. 1 is a block diagram of an abnormality detection system according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereunder, an exemplary embodiment of an abnormality detection system and a method of detecting abnormality according to the present invention will be described in details, referring to the accompanying drawings. In the drawings, same constituents are given the same numerals, and the description thereof will not be repeated.

FIG. 1 is a block diagram of the abnormality detection system according to an embodiment of the present invention. The abnormality detection system 1 includes a measurement unit 10, a decision unit 20, an alarm unit 30, and storage units 40, 50, and serves to detect the abnormality in a control characteristic value of a plurality of products manufactured on the same production line. In this embodiment, it will be assumed that the product is a semiconductor device product. The semiconductor device product herein referred to is a wafer on which LSI (Large Scale Integration) or discrete devices are being processed.

The measurement unit 10 serves to measure the control characteristic value of each of the semiconductor device products. The measurement unit 10 sequentially measures the control characteristic values of the plurality of semiconductor device products running on the production line. Either all or a part of the semiconductor device products running on the production line may be measured. In the latter case, for example one out of every several consecutive pieces may be picked up for the measurement.

The storage unit 40 serves to store therein the control characteristic values measured by the measurement unit 10. In the storage unit 40, the control characteristic values actually measured with respect to the semiconductor device products are stored in association with the lot number of those semiconductor device products. The information on the control characteristic values measured by the measurement unit 10 may be input to the storage unit 40 directly by the measurement unit 10, or via the decision unit 20 which will be described later. Also, control characteristic values may be input to the storage unit 40 or the decision unit 20 either automatically or manually. The storage unit 40 may be constituted of a RAM (Random Access Memory), a ROM (Read Only Memory) or the like.

The decision unit 20 inputs the control characteristic value stored in the storage unit 40, and decides whether an abnormality exists, based on that value. More specifically, the decision unit 20 decides whether the following condition (i) is satisfied.

(i) With respect to m pieces (m is a natural number) of the products that are consecutively manufactured, an absolute value of a difference in control characteristic value between each of the products and another product manufactured immediately before the former is equal to or less than a predetermined constant.

When such condition (i) is satisfied, the decision unit 20 decides that the control characteristic value is abnormal. This will be referred to as an abnormality decision rule of "consecutive same points".

Here, "the products are consecutively manufactured" means that those semiconductor device products that are the object of the measurement of the control characteristic value are consecutively manufactured. For example, when the semiconductor device products to be measured are picked up with intervals of k pieces (k is a natural number) of the semiconductor device products running on the production line, the semiconductor device product that is (k+1) pieces anterior and (k+1) pieces posterior to the semiconductor device product to be measured respectively correspond to the "semiconductor device products that are consecutively manufactured". Also in this case, the semiconductor device product that is (k+1) pieces anterior is the semiconductor device product "manufactured immediately before" the semiconductor device product to be measured.

Further, the condition that the absolute value of the difference between the control characteristic value ($X_n$) of a certain product and the control characteristic value ($X_{n-1}$) of the product manufactured immediately before the former product is equal to or less than the predetermined constant may be expressed as the equation given below:

$$|X_n - X_{n-1}| \leq b$$

Here, b is a constant equal to or greater than zero. When the absolute value of the difference between the points ($X_{n-1}$, $X_n$) that are adjacent on a given control graph is b or less, the values of the two points will be regarded as generally the same. The constant b is a value determined based on the measurement unit. Although the values are actually the same, the values may be regarded to be different and transmitted to the host computer as different values, because of rounding off or up the fraction below the minimum measurement digit, depending on the type of the equipment or the measuring terminal. Accordingly, it is preferable to set the value of b so that, even in such a case, the values are decided to be the same, i.e. so that the foregoing equation is satisfied.

The alarm unit 30 serves to announce to the effect that the abnormality decision has been made by the decision unit 20. When the decision unit 20 makes the abnormality decision, the information to that effect is transmitted by the decision unit 20 to the alarm unit 30. Upon receipt of such information, the alarm unit 30 announces the occurrence of the abnormality. Announcing methods to be performed by the alarm unit 30 include an audible method such as generating an alarm sound, and a visual method such as turning on an LED (Light Emitting Diode) light or displaying on an LCD (Liquid Crystal Display) screen to the effect that the abnormality has been detected.

The storage unit 50 is a decision condition storage unit that stores therein information on the conditions for the abnormality decision to be made by the decision unit 20. The conditions may include, for example, the values of m and b. The decision unit 20 refers to the decision condition stored in the storage unit 50, when deciding whether an abnormality exists. The decision condition may be input to the storage unit 50 by a desired method. The storage unit 50 may be constituted of a RAM, a ROM or the like, as the storage unit 40. The storage unit 50 does not necessarily have to be separately provided from the storage unit 40, but may be integrally provided with the storage unit 40. For example, a single RAM may be given the functions of the both storage units 40, 50.

Figure 2:
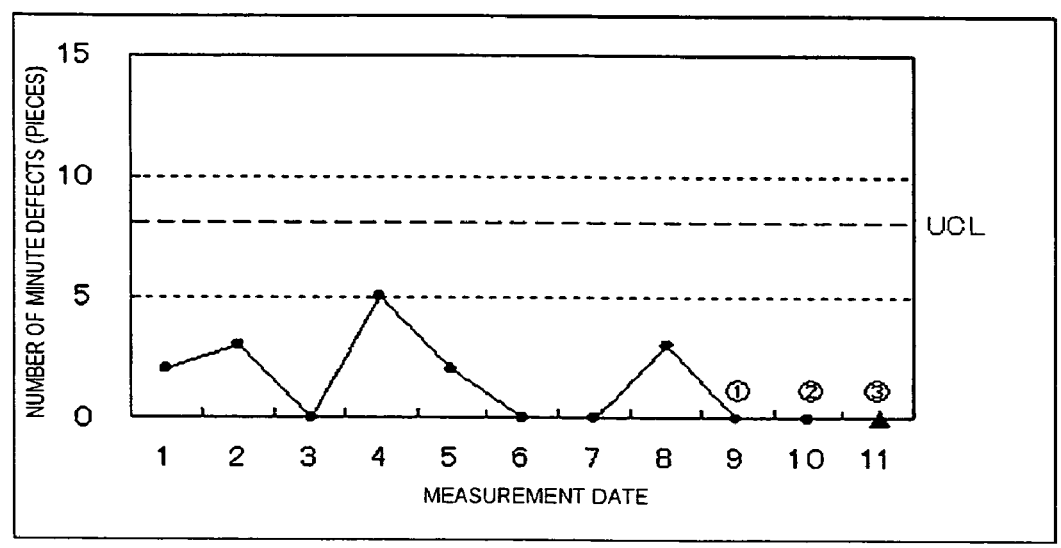
FIG. 2 is a graph for explaining the method of detecting abnormality according to the embodiment of the present invention.
Figure 3:
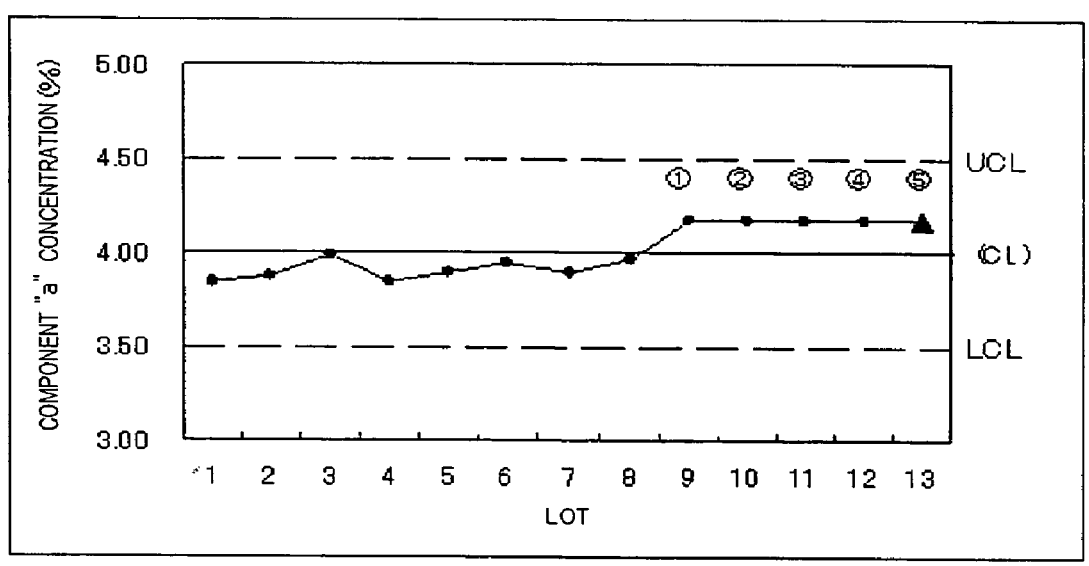
FIG. 3 is a graph for explaining the method of detecting abnormality according to the embodiment of the present invention.
Figure 4:
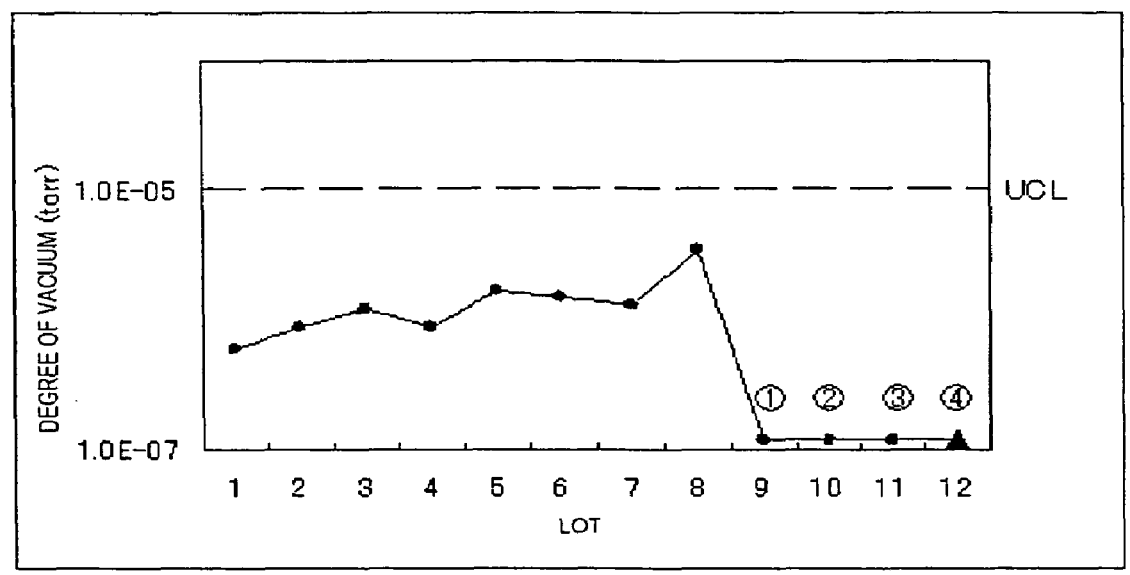
FIG. 4 is a graph for explaining the method of detecting abnormality according to the embodiment of the present invention.
Figure 5:
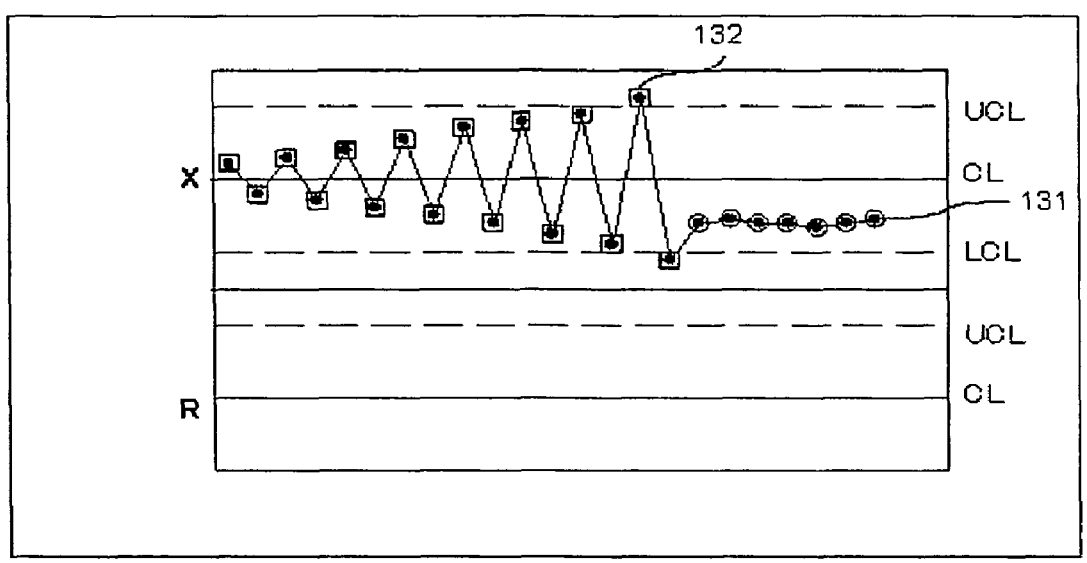
FIG. 5 is a graph for explaining a control chart display apparatus according to the patent document 1.
Figure 6:
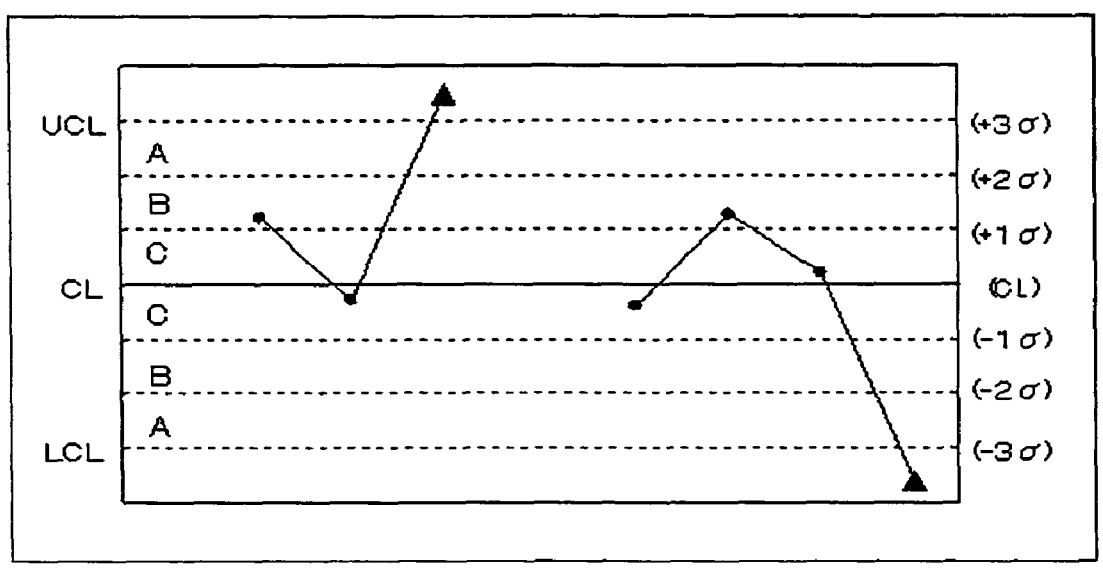
FIG. 6 is a graph for explaining a conventional abnormality decision rule based on a control chart method.

Referring now to FIGS. 2 to 4, the method of detecting abnormality according to an embodiment of the present invention will be described, in combination with an example of the operation of the abnormality detection system 1. In the abnormality detection system 1, control characteristic values of the semiconductor device products, picked up as the object of measurement, are measured by the measurement unit 10. The control characteristic values measured by the measurement unit 10 are stored in the storage unit 40. The decision unit 20 receives the control characteristic values stored in the storage unit 40, and refers to the decision condition stored in the storage unit 50, so as to decide whether an abnormality exists based on the tendency of the control characteristic values.

FIG. 2 represents an application example of the decision rule of the "consecutive same points" to a micro-defect inspection result performed with a laser beam. In this example, the alarm is activated when consecutive three points are the same (m=2). This is because the measurement is daily performed and it is just 1 to 2 points or less out of 100 points that the values become the same for two consecutive days. In this case the alarm is activated at <3>, so as to notify the operator. Upon recognition of the alarm, the operator inspects the process and equipment. Since m is 2 the alarm is activated at <3>, which facilitates discovering the abnormality at an earlier stage.

Figure 7:
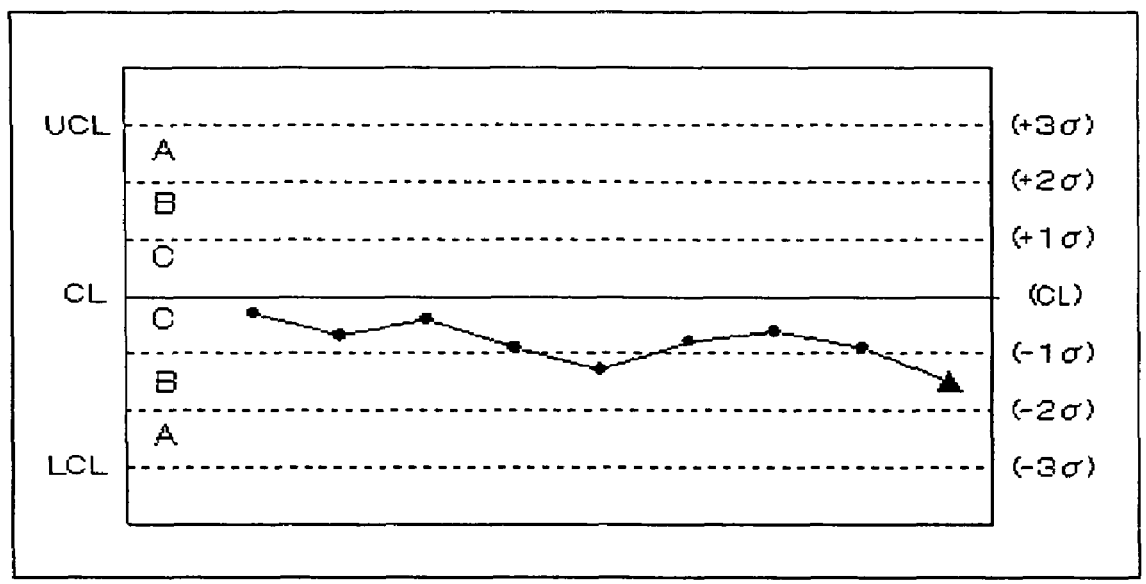
FIG. 7 is a graph for explaining another conventional abnormality decision rule based on the control chart method.
Figure 8:
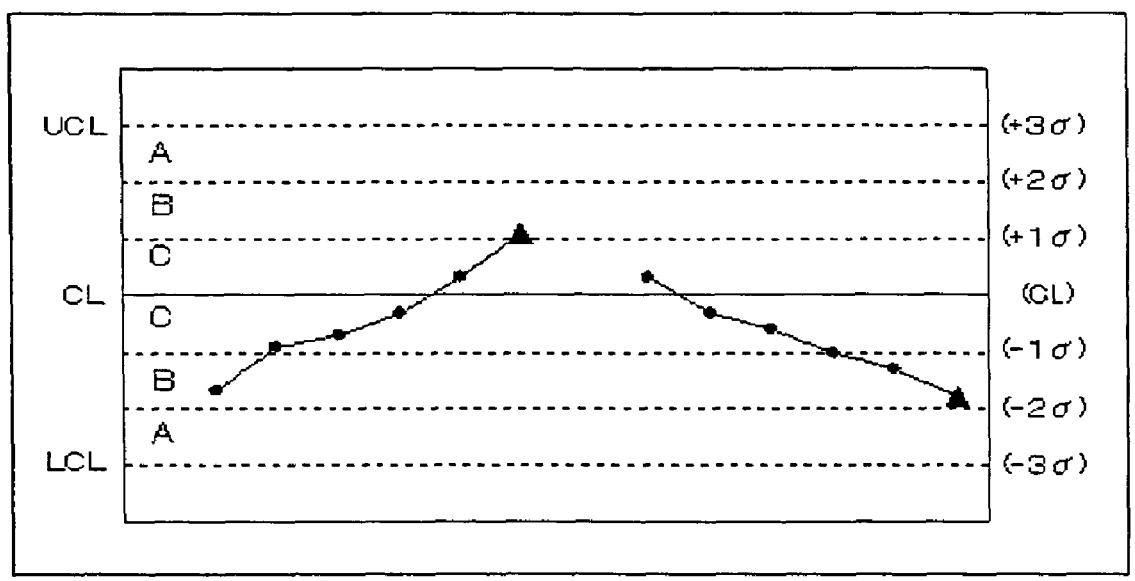
FIG. 8 is a graph for explaining still another conventional abnormality decision rule based on the control chart method.
Figure 9:
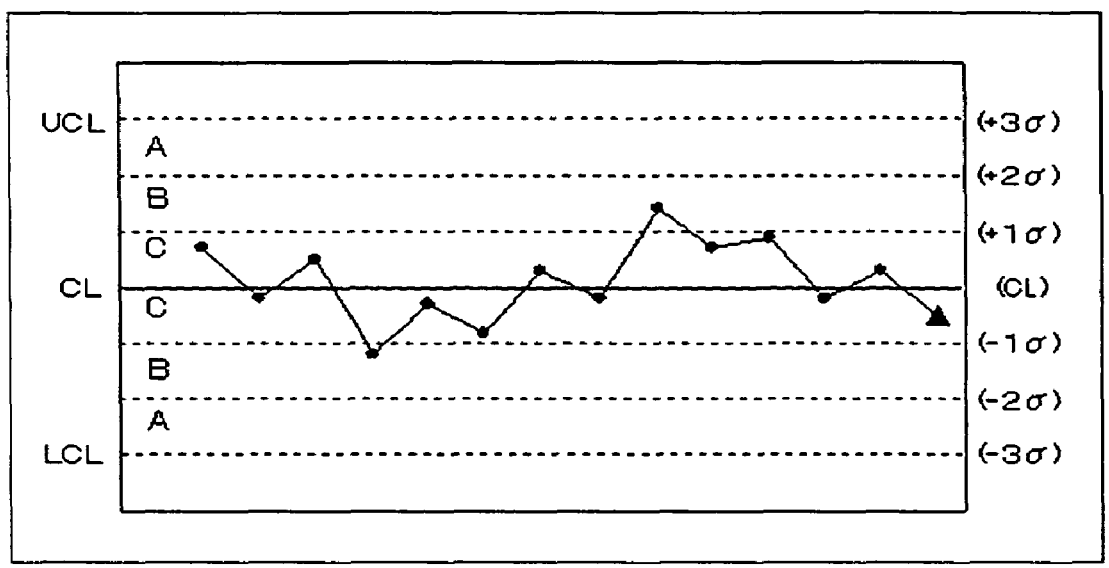
FIG. 9 is a graph for explaining still another conventional abnormality decision rule based on the control chart method.
Figure 10:
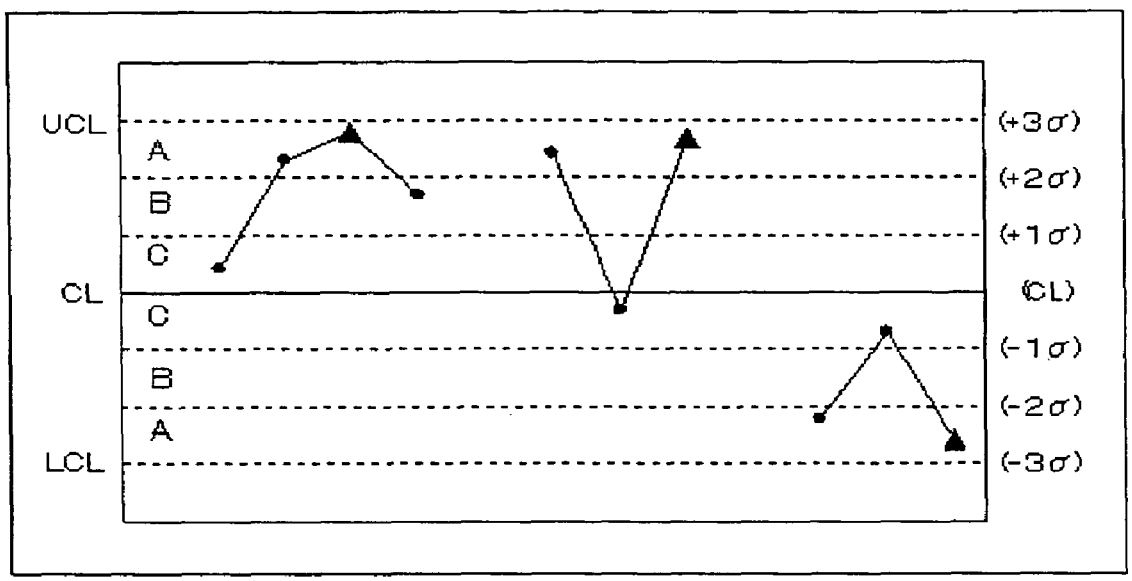
FIG. 10 is a graph for explaining still another conventional abnormality decision rule based on the control chart method.
Figure 11:
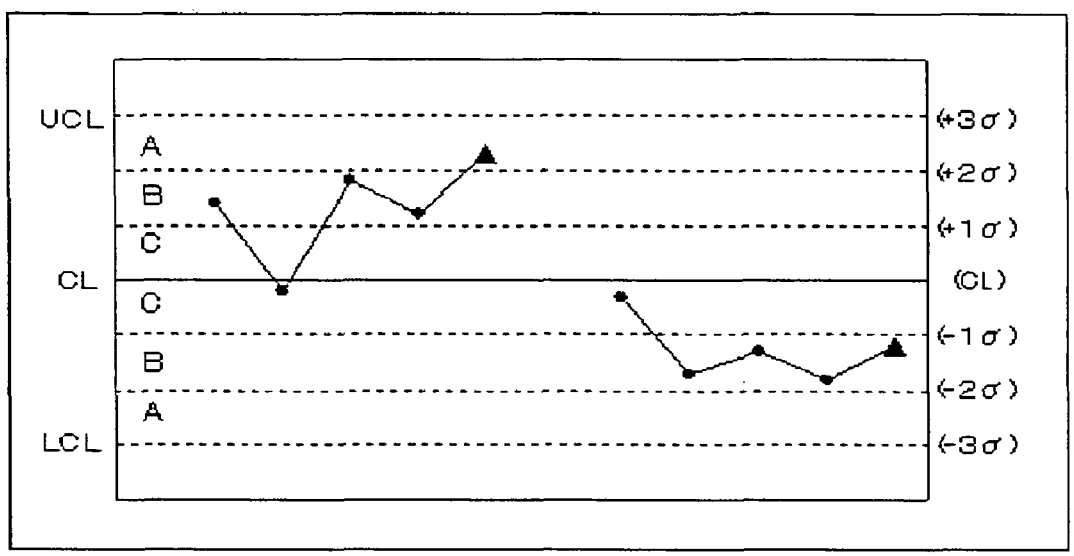
FIG. 11 is a graph for explaining still another conventional abnormality decision rule based on the control chart method.
Figure 12:
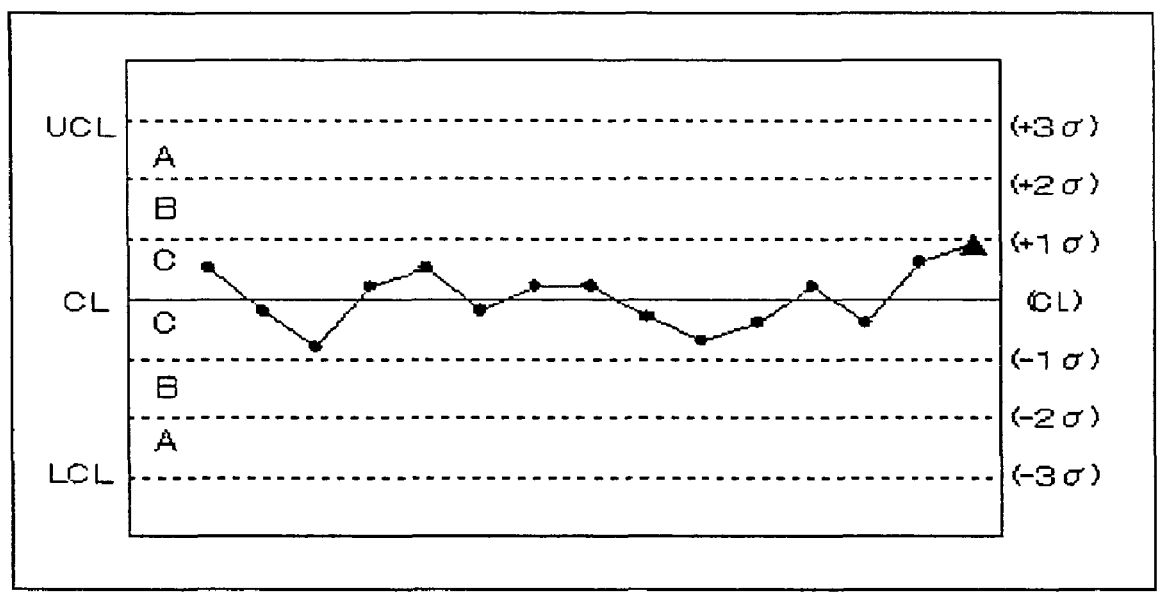
FIG. 12 is a graph for explaining still another conventional abnormality decision rule based on the control chart method.
Figure 13:
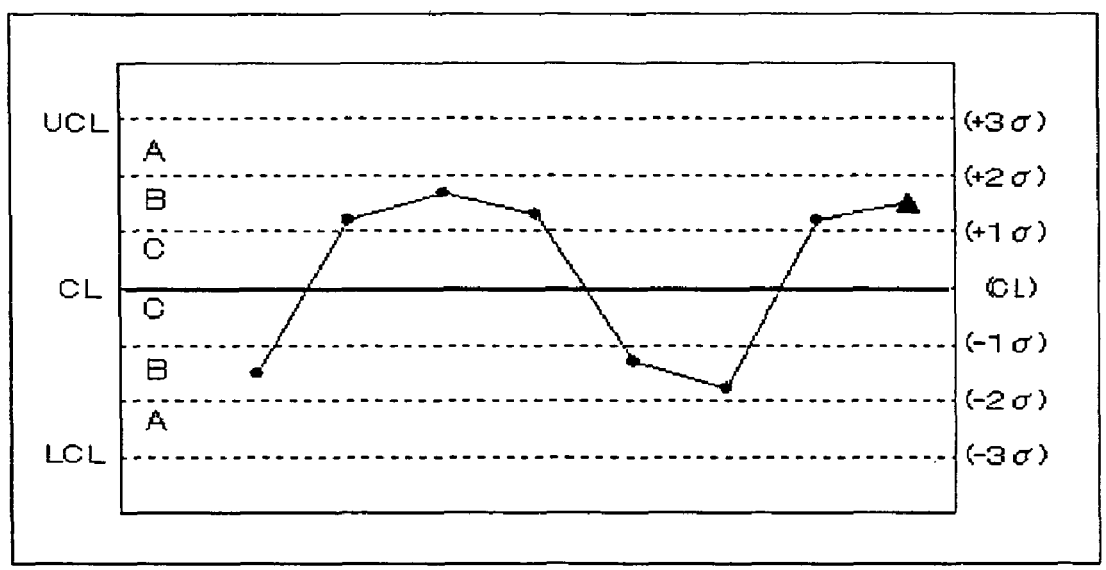
FIG. 13 is a graph for explaining still another conventional abnormality decision rule based on the control chart method.
Figure 15:
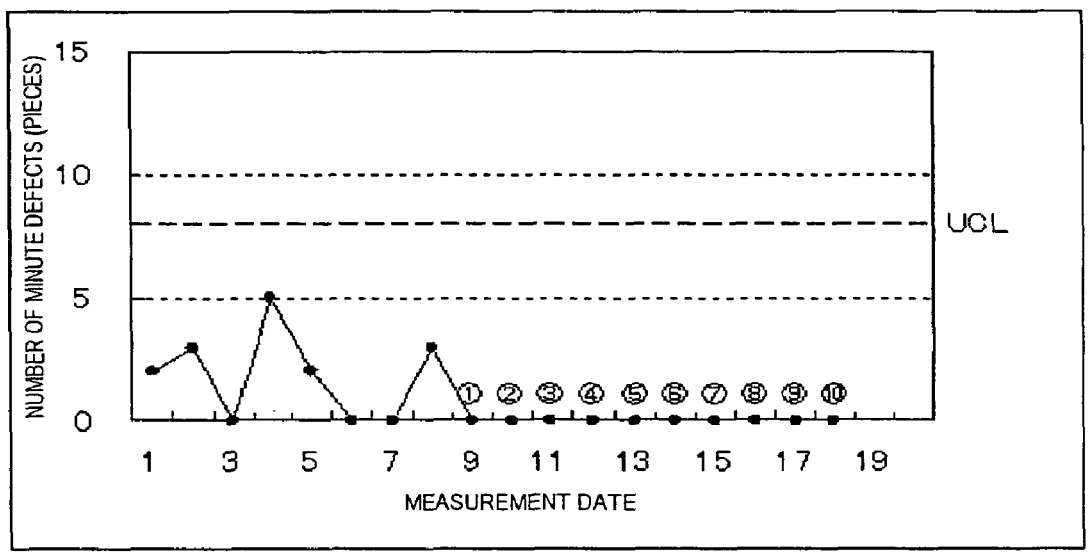
FIG. 15 is a graph for explaining a problem regarding the conventional technique.
Figure 16:
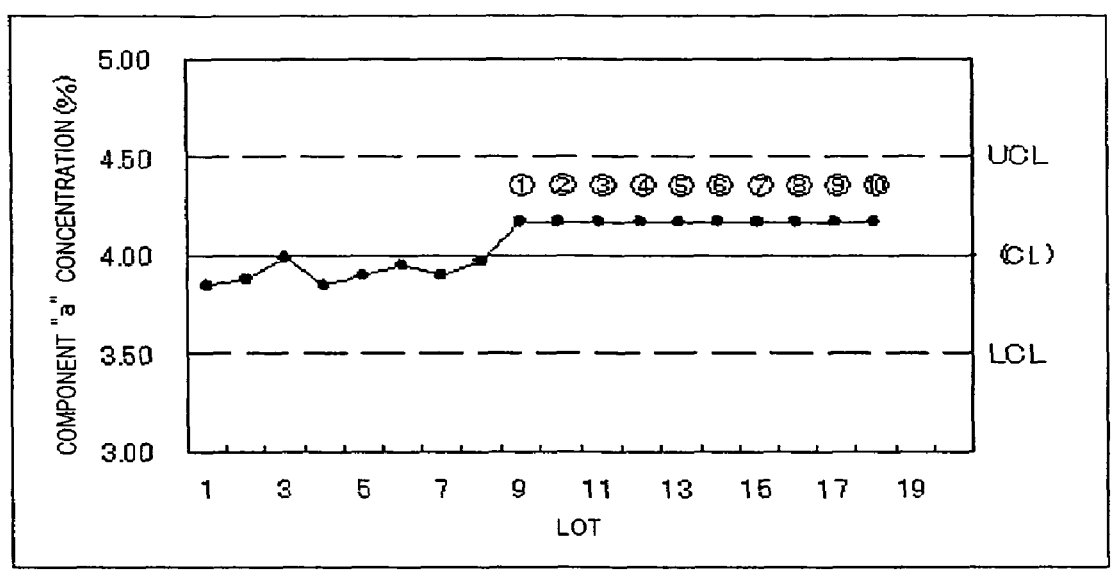
FIG. 16 is a graph for explaining another problem regarding the conventional technique.
Figure 17:
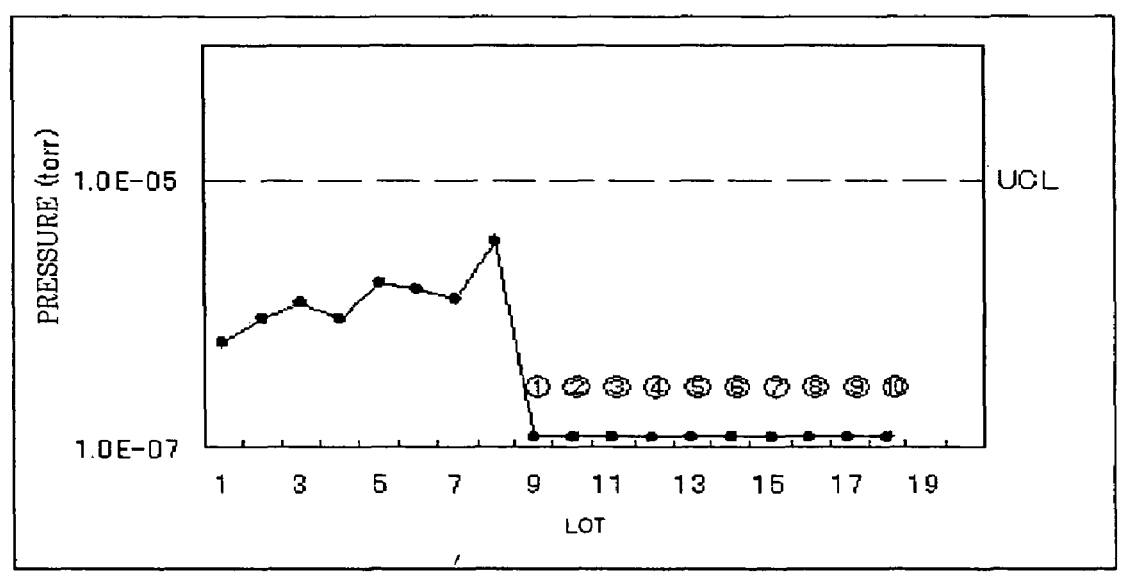
FIG. 17 is a graph for explaining still another problem regarding the conventional technique.

FIG. 3 represents an application example of the decision rule of the "consecutive same points" to the transition in concentration of a component in a cleaning solution employed in a cleaning process. In this example, the alarm is activated when consecutive five points are the same (m=4). This is because the same values may often appear two or three consecutive times, before replacement of the cleaning solution or when the wafer to be cleaned is not provided. In this case the alarm is activated at <5>, so as to notify the operator. Since m is 4 the alarm is activated at <5>, which facilitates discovering the abnormality at an earlier stage. Also, applying the rule relevant to FIG. 7 is no longer necessary, and hence frequent alarms because of the type-1 error can be prevented.

FIG. 4 represents an application example of the decision rule of the "consecutive same points" to a degree of vacuum in an ion implantation equipment. In this example, the alarm is activated when consecutive four points are the same (m=3). This is because the same value may appear, though not often, two to three consecutive times in this equipment. In this case the alarm is activated at <4>, so as to notify the operator. Since m is 3 the alarm is activated at <4>, which facilitates discovering the abnormality at an earlier stage.

The foregoing embodiment of the present invention provides the following advantageous effects. In this embodiment, the abnormality decision is made when generally the same control characteristic values are detected (m+1) consecutive times. Activating the alarm when the same values are consecutively marked allows discovering the abnormality of a measurement system or a communication system at an early stage. In this case, the abnormal period should be identified, and inspection should be carried out to confirm whether the products manufactured during that period are free from abnormality. Such arrangement suppresses the occurrence of the type-1 error, and effectively detecting the abnormality in the control characteristic values originating from the malfunction of the measurement system or the communication system. When the constant b is set as zero, the probability of the occurrence of the type-1 error can be further reduced.

Thus, the present inventors focused on the fact that, in a reasonably controlled equipment or process, a constant value is consecutively marked when a part of the communication system or the measurement system becomes abnormal. Based on such finding, the present inventors have conceived the decision rule of the "consecutive same points", thereby enabling the malfunction of the communication system or the measurement system, effectively and at an earlier stage.

Meanwhile, there are cases that the foregoing rule relevant to FIG. 7 is applicable for detecting the abnormality. However, since the rule of FIG. 7 suggests that "the process average may have shifted upward or downward", in most of the cases it is not possible to immediately ascertain, upon recognition of the alarm, that the measurement system or the communication system has an abnormality. Accordingly, the malfunction in the measurement system or the communication system, which is the true reason of the abnormality, can only be discovered after inspecting the possibility of the shift of the process average. In a word, it takes too long before discovering the true reason, after the activation of the alarm. On the contrary, the alarm based on the "consecutive same points" is of the nature that suggests that the measurement system or the communication system may have an abnormality. Therefore, the abnormality in the measurement system or the communication system can be immediately ascertained, which results in reduction of the time before discovering the true reason of the abnormality.

As described above, the foregoing embodiment enables detecting an abnormality arising from a measurement system or a communication system, with a fewer number of plots and without incurring an increase in type-1 error. Besides, the embodiment enables shortening the time and steps before discovering the true reason of the abnormality, upon detection of the abnormality. The embodiment thus enables making an abnormality decision appropriate for the semiconductor industry, in the process control of an electronically controlled semiconductor device production line.

The abnormality detection system and the method of detecting abnormality according to the present invention are not limited to the foregoing embodiment, but various modifications may be made. For example, while the micro-defect inspection equipment that employs a laser beam, a wafer cleaning equipment and an ion implantation equipment are selected for description of the embodiment, the present invention may be suitably applied also to other equipments.

It is apparent that the present invention is not limited to the above embodiment, and may be modified and changed without departing from the scope and spirit of the invention.

What is claimed is:

1. An abnormality detection system comprising:
a measurement unit that measures different control characteristic values of a plurality of products manufactured on a same production line, said measurement unit being a non-image sensor;
a host computer that detects an abnormality in the measured control characteristic values arising from a malfunction in a connection between said measurement unit and said host computer, wherein said host computer executes centralized control of the production line,
the host computer comprising:
a storage unit that stores said control characteristic values measured with respect to said products and communicated on-line from said measurement unit; and
a decision unit that
a) acquires said control characteristic values from said storage unit,
b) decides whether a specific condition (i) is satisfied, the specific condition being, with respect to m pieces (m is a natural number) of said products that are consecutively manufactured, whether an absolute value of a difference in a respective one of said control characteristic values between each of said products and said product manufactured immediately before each of said products is equal to or less than a predetermined constant, and
c) decides that the respective one of said control characteristic values is abnormal due to a malfunction of the measurement unit or of a communication system that communicates said control characteristic values when said specific condition (i) is satisfied.

2. The abnormality detection system according to claim 1, wherein said constant is zero.

3. A method of a host computer detecting an abnormality in control characteristic values of a plurality of products manufactured on a same production line, comprising:
measuring, with a measurement unit that is a non-image sensor, different control characteristic values of a plurality of products manufactured on a same production line;
said host computer executing centralized control of the production line;
storing in a storage unit in said host computer said control characteristic values measured with respect to said products and communicated on-line from said measurement unit;
acquiring said control characteristic values from said storage unit;
deciding whether a specific condition (i) is satisfied, the specific condition being, with respect to m pieces (m is a natural number) of said products that are consecutively manufactured, whether an absolute value of a difference in a respective one of said control characteristic values between each of said products and said product manufactured immediately before each of said products is equal to or less than a predetermined constant; and
deciding that the respective one of said control characteristic values is abnormal due to a malfunction arising from a malfunction in a connection between said measurement unit and said host computer when said specific condition (i) is satisfied.

4. The abnormality detection system according to claim 1, further comprising:
an alarm unit that announces an occurrence of a malfunction of the measurement unit or of the communication system when said specific condition (i) is satisfied.

5. The method according to claim 3, further comprising the step of announcing an occurrence of a malfunction of the measurement unit or of the communication system when said specific condition (i) is satisfied.

6. The abnormality detection system according to claim 1, wherein said control characteristic values are measured on each of plural semiconductor device products on a semiconductor device production line.

7. The method according to claim 3, wherein said control characteristic values are measured on each of plural semiconductor device products on a semiconductor device production line.

* * * * *